United States Patent [19]
Parro

[11] Patent Number: 5,325,043
[45] Date of Patent: Jun. 28, 1994

[54] GENERIC CONTROL UNIT

[75] Inventor: Bob Parro, Rockford, Ill.

[73] Assignee: Sundstrand Corporation, Rockford, Ill.

[21] Appl. No.: 910,671

[22] Filed: Jul. 8, 1992

Related U.S. Application Data

[62] Division of Ser. No. 432,596, Nov. 7, 1989, Pat. No. 5,153,498.

[51] Int. Cl.$^5$ .......................... H02H 7/06; H02P 9/00
[52] U.S. Cl. .......................... 322/23; 322/28; 322/29; 361/20
[58] Field of Search .......................... 322/25, 27, 28, 23, 322/29; 320/64; 361/20

[56] References Cited

U.S. PATENT DOCUMENTS

| | | | |
|---|---|---|---|
| 4,477,765 | 10/1984 | Glennon et al. | 322/27 X |
| 4,629,968 | 12/1986 | Butts et al. | 322/28 X |
| 4,651,081 | 3/1987 | Nishimura et al. | 320/64 |
| 4,684,873 | 8/1987 | Glennon | 322/47 |
| 5,006,781 | 4/1991 | Schultz et al. | 322/25 |

Primary Examiner—R. J. Hickey
Attorney, Agent, or Firm—Wood, Phillips, VanSanten, Hoffman & Ertel

[57] ABSTRACT

The problems of minimizing size and weight in an aircraft and avoiding requirements for custom design are minimized in a generator control unit (22) provided with separate digital control circuits (74 and 76) for implementing voltage regulation and speed control. These circuits (74 and 76) are manufactured using custom very large scale integration (VLSI) technology to reduce size, weight, life cycle costs and improve reliability.

4 Claims, 13 Drawing Sheets

GENERIC CONTROL UNIT

This is a division of application Ser. No. 432,596 filed Nov. 7, 1989, now U.S. Pat. No. 5,153,498.

FIELD OF THE INVENTION

This invention relates to electrical power generating systems and, more particularly, to an improved generator control unit for developing constant frequency and constant voltage output power.

BACKGROUND OF THE INVENTION

A conventional electrical power generating system (EPGS) for an aircraft, in one known form, comprises an integrated drive generator including a constant speed drive and a generator. The integrated drive generator receives mechanical power at varying speed from an aircraft engine and delivers electrical power at constant frequency. The constant speed drive includes a speed control assembly and receives mechanical input power at varying speed from the aircraft engine and delivers power from its output shaft at constant speed. The generator comprises a salient pole machine with a rotating field which is excited through an exciter powered by a permanent magnet generator (PMG) through a voltage regulator. Such conventional systems use a generator control unit (GCU) to provide voltage regulation and speed regulation. Specifically, a voltage regulator provides excitation power to an exciter at levels which provide constant system voltage at the point of regulation. A speed control controls trimming of a servo valve to maintain generator speed, and thus frequency, to be constant.

Prior generator control units used either analog or digital circuits, with the choice being based on factors such as weight, size, cost and complexity of control logic. In analog systems both integrated circuits and discrete components are used and some signals are converted to digital form. However, signals are combined and perform their required functions using analog type control. Such system products incorporate standard, off-the-shelf components. Implementing a system which has the complexity of a generator control unit with standard product technology requires the use of many hundreds of electronic devices even for a relatively simple application, such as for a single channel EPGS. Each device adds additional weight to the product, including indirect weight in the form of additional circuit board area and housing needed to support the inclusion of each device. Since commercial and military aircraft are the intended end use of such products, it is desirable to minimize weight.

Further, analog circuits tend to be environmentally sensitive. For example, parameter drift results owing to changes in temperature and humidity, as well as age of the devices. Further, with analog technology the control cannot be easily changed. Instead, circuit components must be modified resulting in custom design for each different application.

In digital control systems, conversely, all signals are converted to digital form and certain control and protection functions are controlled by a microprocessor. As such, the control system is inherently more flexible in implementing different control schemes. In a digital control system the control unit contains a microprocessor and associated software and continuously and sequentially checks for proper system conditions and for control commands, and performs the programmed sequence of instructions. However, the actual flexibility available with such a digital system is limited due to limitations in processing time available in the microprocessor for performing both control and protection functions. Also, if the microprocessor implements both the control and protection functions, then a single GCU fault could cause malfunction of all such functions. In fact, known GCU systems employ an analog control for implementing the voltage regulator functions separately. As a result, it is necessary to provide circuit components associated with voltage regulation.

Additional problems result in the design of generator control units. In each application it is necessary to develop a cost effective, lightweight solution. Therefore, the designer must start from "scratch" in designing a generator control unit for each new application. This results in each generator control unit being custom made and therefore more expensive.

The present invention is directed to overcoming one or more of the problems discussed above.

SUMMARY OF THE INVENTION

In accordance with the invention, a generator control unit is provided with digital control circuits to reduce size, weight and to provide improved reliability.

Broadly, there is disclosed herein a generator control unit (GCU) for an electrical power generating system (EPGS) having a generator, with means responsive to a first control signal for varying generator output power, and a drive for the generator, with means responsive to a second control signal for varying generator speed. The GCU comprises a first digital control circuit including means responsive to system condition inputs for developing a first control signal to maintain generator output power at a desired voltage level, and a second digital control circuit including means responsive to system condition inputs for developing the second control signal to maintain generator output power at a desired frequency.

It is a feature of the invention, wherein the EPGS includes a contactor connecting the generator to a power bus, that the GCU further comprises a processor responsive to system condition inputs for controlling the contactor to protect the EPGS.

It is another feature of the invention that the GCU is provided with an interface circuit providing a communication interface between the processor and the system condition inputs. In one form the interface circuit is an analog-to-digital converter circuit.

It is a additional feature of the invention that the first and second digital control circuits each comprise a processor which develops the respective control signal in accordance with an algorithm including at least one gain and compensation function and a memory associated with the processor storing the algorithm and the gain and compensation variables for retrieval by the processor in performing the algorithm.

It is a further feature of the invention that the GCU comprises a further processor connected with the first and second digital control circuits for loading the variables into the memories.

It is yet another feature of the invention that the further processor loads the one algorithm into the second digital control circuits memory.

It is yet a further feature of the invention that the GCU is provided with an analog circuit providing a signal conditioning interface between the first and second digital control circuits and the system condition inputs.

It is still another feature of the invention that the GCU is provided with an analog circuit providing the signal conditioning interface between the digital interface circuit and the system condition inputs.

There is disclosed herein according to another aspect of the invention a generator control unit for an electrical power generating system having a generator, a drive for the generator, and a fault control means connecting the generator and the EPGS for protecting the EPGS under fault conditions. The GCU comprises a control circuit and a protection circuit. The control circuit includes means responsive to system condition inputs for controlling generator operation to maintain generator output power at a desired voltage level and frequency. The protection circuit includes a processor responsive to system condition inputs for controlling operation of the fault control means, and a digital interface circuit providing a communication and status interface between the processor and the system condition inputs and between the processor and the fault control means.

There is disclosed herein according to a further aspect of the invention a generator control unit for an electrical power generating system having a generator, with means responsive to a first control signal for varying generator output power, a drive for the generator, with means responsive to a second control signal for varying the generator speed, and fault control means connecting the generator in the EPGS for protecting the EPGS under fault conditions. The GCU comprises a control circuit including means responsive to system condition inputs for developing the first and second control signals to maintain generator output power at the desired voltage level and frequency. A protection circuit includes a processor responsive to a system condition inputs for controlling operation of the fault control means. A first analog circuit is operatively associated with the control circuit providing a signal conditioning interface between the developing means and the system condition inputs. A second analog circuit is operatively associated with the protection circuit providing a signal conditioning interface between the processor and the system condition inputs.

More specifically, there is disclosed herein an integrated drive generator (IDG) controlled by a generator control unit (GCU) for developing constant frequency power for driving aircraft loads. The GCU is intended to be used as an off-the-shelf product which can be employed in any GCU application without signal level hardware redesign.

A conventional IDG includes a constant speed drive which receives input power from an aircraft engine and converts it to constant speed power for driving an electrical generating system. The constant speed drive is controlled by a speed control loop in the GCU. The generating system includes a permanent magnet generator, an exciter and a main generator. The PMG develops power which is regulated by a voltage control loop in the GCU to control excitation, and thus main generator output voltage.

The GCU provides isolation of control circuits from protection circuits. The control circuits include a pair of VLSI integrated circuit chips. One is a custom digital voltage regulator chip which executes the voltage regulation control loop. The other is a custom digital speed control chip which executes the speed control loop. The protection circuit includes a microprocessor system and a custom digital interface chip which together carry out the communication, protection, breaker control, and built-in-test (BIT) functions. Custom analog chips are provided for input signal conditioning independently to the control circuit and the protection circuit. The analog input conditioning is used to filter analog input signals and convert them to a set level using analog to digital conversion.

The voltage regulator chip includes an average voltage control algorithm for maintaining generator output voltage at a desired level, as well as overload control algorithms, such as a current limit loop, and a high phase voltage takeover loop. The chip is further provided with reactive and real load division loops which are utilized during parallel channel operation of multiple generators. These standard loops are preconfigured in the voltage regulator chip. The specific program values which are application dependent can be preloaded at startup from the microprocessor or from an EPROM.

The speed control chip uses an algorithm loaded in from an EPROM or from the microprocessor at startup. However, the hardware remains fixed for any application.

By using separate and independent digital chips for the voltage regulation and speed control, the GCU is more flexible in operation, provides quicker control response and handles fault control loops directly in the digital controllers. Also, the GCU provides for more significant separation of control and protection functions, thereby reducing the likelihood of a single GCU fault causing the malfunctioning of both control and protection functions.

The protection circuit includes analog input conditioning generally redundant to that provided in the control circuit. The interface chip includes support circuits for the microprocessor to reduce the burden of the microprocessor operation. Specifically, the interface chip controls data acquisition and communication to external control devices. The microprocessor is programmed to perform all logic functions. The microprocessor can read the contents of the voltage regulator and speed control chips. However, the microprocessor can only write to specific areas in these chips such as for sending out set point values and the like. Thus, the voltage regulator chip and speed control chip are dependent on the microprocessor for the control functions only during initialization, such as at powerup.

The protection circuit further includes output conditioning circuits which control breakers and switches and the like to provide fault protection, BIT stimuli and communications.

Further features and advantages of the invention will readily be apparent from the specification and from the drawings.

DESCRIPTION OF THE INVENTION

Figure 1:
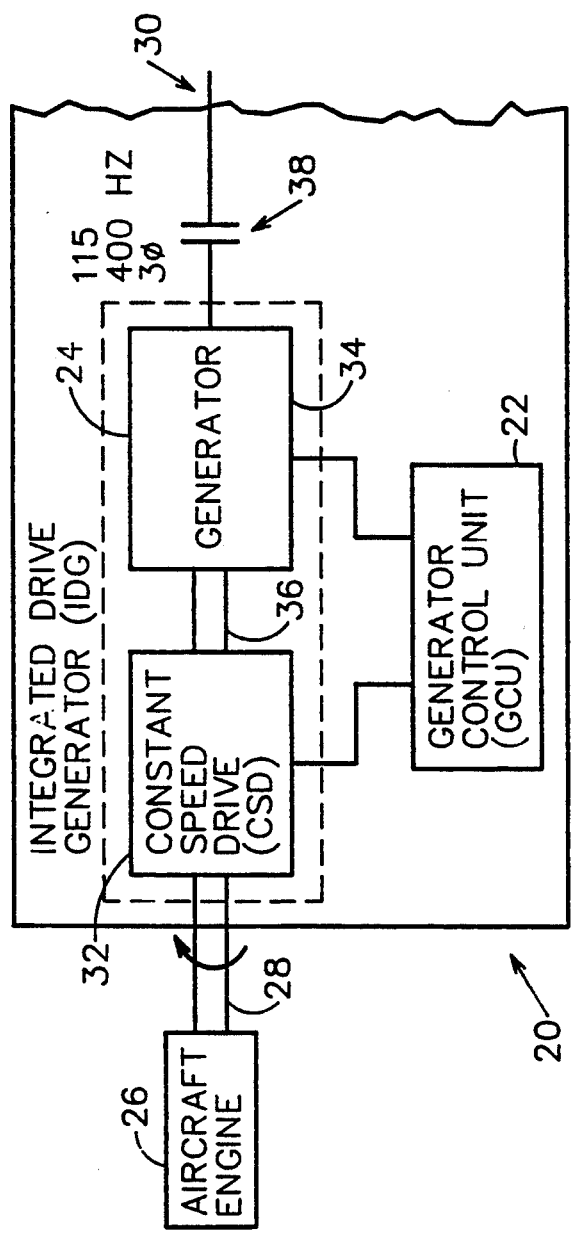
FIG. 1 is a simplified block diagram for an aircraft electrical power generating system (EPGS) including a generator control unit (GCU) according to the invention.

With reference to FIG. 1, a block diagram representation illustrates an electrical power generating system (EPGS) 20 including a generator control unit (GCU) 22 according to the invention. In the illustrated embodiment, the EPGS 20 is used in an aircraft for providing power to aircraft loads. The GCU 22 could be used in connection with various other generating systems, as is obvious to those skilled in the art.

In addition to the GCU 22, the EPGS 20 includes an integrated drive generator (IDG) 24. The IDG 24 receives mechanical power at varying speed from an aircraft engine 26 through a rotating shaft 28 and delivers electric power at constant frequency at a power bus 30. The IDG 24 includes a constant speed drive 32 and a generator 34. The constant speed drive 32 receives mechanical input power from the shaft 28 at varying speed and delivers mechanical power from its output shaft 36 at constant speed. The generator 34 is driven by the shaft 36 and develops electrical output power through suitable fault protection circuits represented by a generator relay or contactor, illustrated schematically at 38, to the bus 30.

Figure 2:
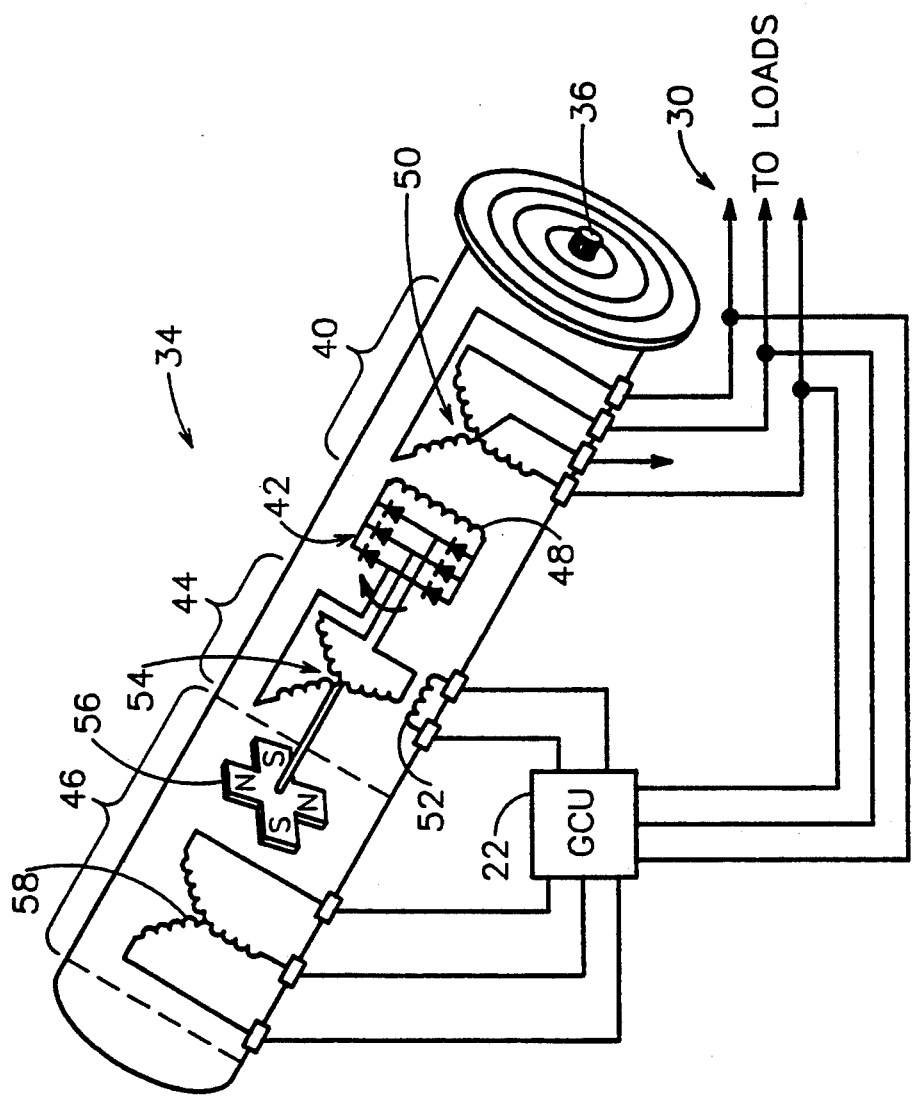
FIG. 2 is a combined schematic and perspective view of an EPGS generator.

With reference also to FIG. 2, the generator 34 includes a main generator 40, a rotating rectifier bridge assembly 42, an exciter 44 and a permanent magnet generator (PMG) 46. Each of the main generator 40, exciter 44 and PMG 46 includes a rotor driven by the constant speed drive 32 via the common shaft 36. As is well known, the generator 34 may be mounted in a common housing with the constant speed drive 32 and, more specifically, may be mounted in line or side-by-side, as is necessary or desired.

The main generator 40 is a salient pole machine having a rotating field producing output power at a frequency of 400 Hz. Particularly, a four pole machine is used at 12,000 rpm, while a two pole machine is used at 24,000 rpm. The main generator 40 includes a rotor carrying a DC field winding 48, and a stator carrying a polyphase AC armature winding 50.

The exciter 44 is a multi-pole salient pole machine which provides excitation to the main generator 40. The exciter 44 includes a stator carrying a DC field winding 52 and a rotor carrying a polyphase AC armature winding 54. The armature winding 54 is connected through the rotating rectifier bridge assembly 42 to the main armature DC field winding 48.

The PMG 46 is a pilot generator in which field flux is provided by a permanent magnet 56 mounted on a rotor driven by the shaft 36 and which is magnetically coupled with a polyphase stator armature winding 58.

The PMG stator winding 58 is connected through the GCU 22 to the exciter DC field winding 52. Although not specifically illustrated herein, the GCU 22 includes a rectifier which converts the polyphase AC power from the PMG stator winding 58 to DC power which is regulated to drive the exciter DC field winding 52.

As is conventional in brushless power generators, rotation of the shaft 36 by the aircraft engine 26 through the constant speed drive 32 and a gearbox, not shown, results in generation of a polyphase voltage in the exciter armature windings 54 as they traverse the magnetic field set up by the exciter DC field winding 52. This polyphase voltage is rectified by the rotating rectifier bridge assembly 42, and the rectified power is coupled to the main generator field winding 48. The current in the main generator field winding 48 and the rotation of the shaft 36 sets up a rotating magnetic field in space occupied by the main generator stator windings 50. The stator windings 50 develop polyphase output power at constant frequency which is delivered to the AC bus 30 for powering loads.

Figure 3:
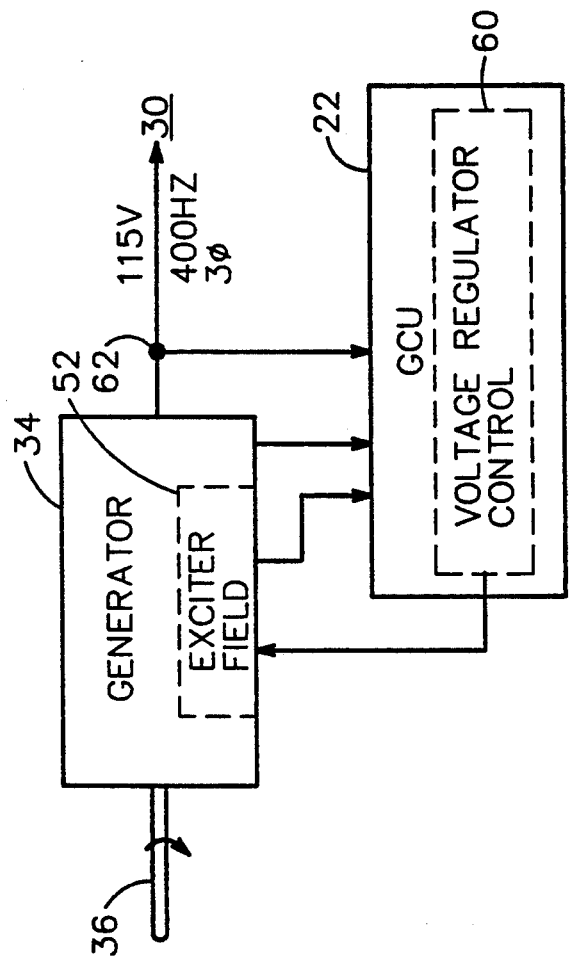
FIG. 3 is a simplified block diagram of a voltage regulator control loop.

With reference also to FIG. 3, a block diagram illustrates a control loop for regulating excitation to the exciter DC field winding 52. Specifically, a voltage regulator control 60 in the GCU 22 controls generator output voltage at a point of regulation (POR) as sensed by a voltage sensor 62 by regulating the energy coupled from the exciter field winding 52 to the exciter armature winding 54 and ultimately to the main generator 40.

Figure 4:
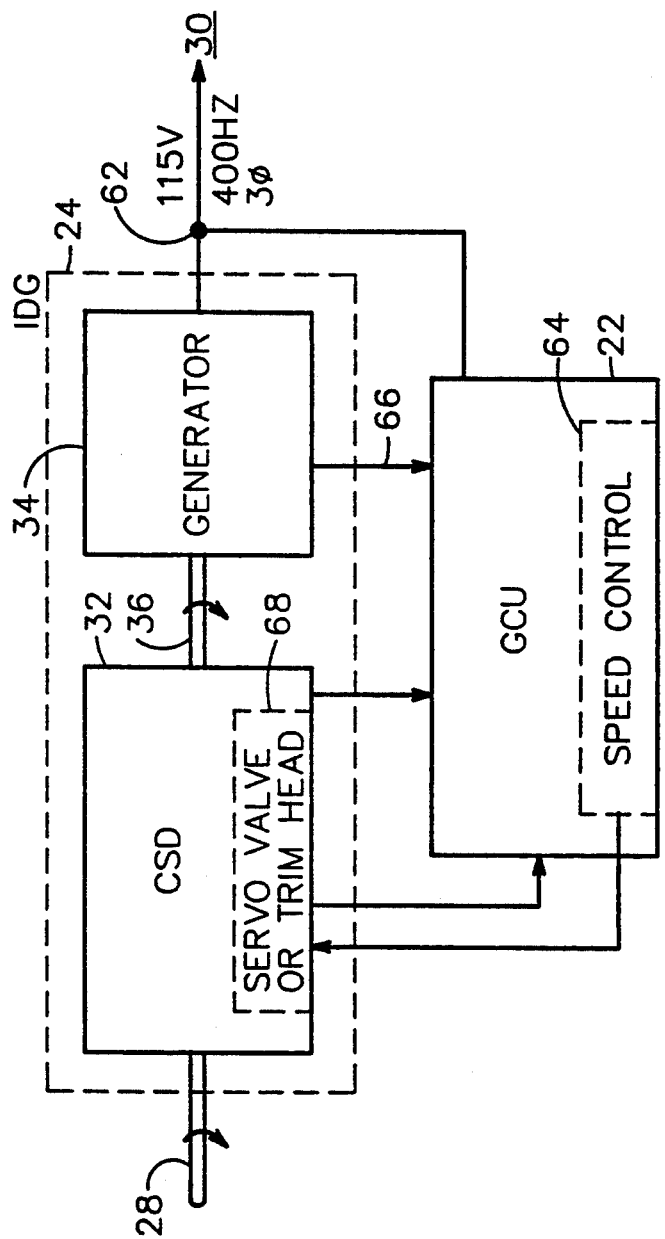
FIG. 4 is a simplified block diagram of a speed control loop.

With reference also to FIG. 4, a block diagram illustrates a speed control loop for controlling output speed of the constant speed drive 32. The GCU 22 includes a speed control 64 which receives a frequency signal on a line 66 from the generator 34. As is well known, the frequency of the power on the line 66 is representative of speed of the shaft 36. The speed control 64 alters the position of a servo valve or trim head 68 in the constant speed drive 32 in order to maintain a constant output speed on the shaft 36.

Figure 5:
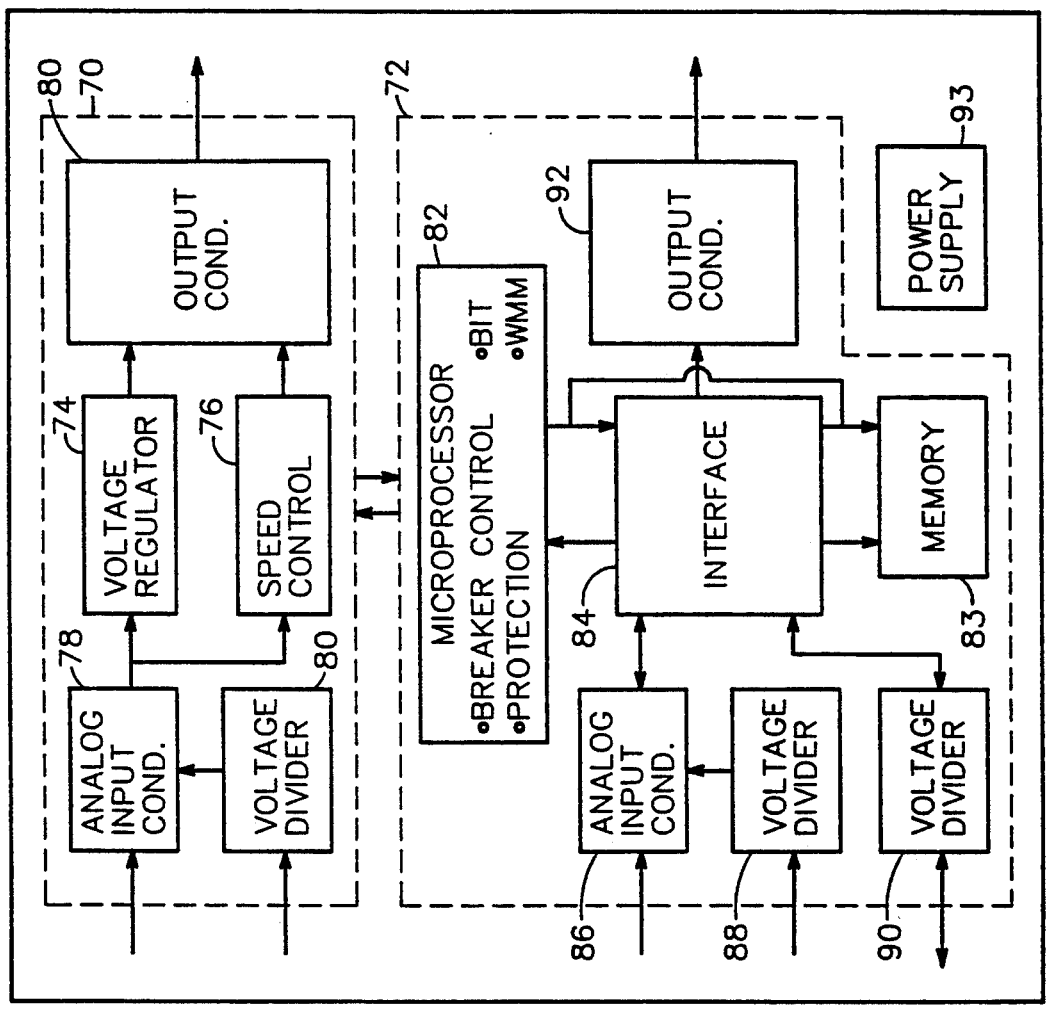
FIG. 5 is a functional block diagram for the GCU of FIG. 1.

With reference to FIG. 5, a functional block diagram illustrates a representation of the GCU 22, see FIG. 1, according to the invention. The GCU 22 provides for separation of control functions as surrounded by a first block in dashed line 70, and protection functions, as surrounded by a second block in dashed line 72.

The control side functions include a voltage regulator block 74 and a speed control block 76. System condition inputs to the voltage regulator block 74 and the speed control block 76 are conditioned in an analog input conditioner block 78 and a voltage divider block 80. Both the voltage regulator block 74 and the speed control block 76 use pulse width modulated (PWM) control at their outputs which are current and voltage amplified in an output conditioning block 80. The outputs of the output conditioning block 80 directly connect to the exciter field 52, see FIG. 3, and the servo valve or trim head 68, see FIG. 4.

The GCU protection side 72 includes a processor block 82 which executes protection, breaker control, built-in-test (BIT), and communications algorithms stored in program memory. An interface block 84 connected to the processor block 82 relieves the processor block 82 of the signal conditioning interface burden, as well as integrating most of the digital support functions that microprocessors normally require. The protection side 72 also includes an analog input conditioner block 86 and a voltage divider block 88, similar to the blocks 78 and 80 discussed above, which receive system condition inputs and provide analog input conditioning and high voltage conditioning of analog and discrete signals for the previously mentioned functions. A communication link drivers block 90 allows the processor block 82 to communicate via the interface block 84 to a serial link. An output conditioning block 92 provides voltage and current amplification for output signals from the interface block 84. For example, the output conditioning block 92 controls operation of the generator relay contactor 38, see FIG. 1, and other conventional generator fault protection devices.

Figure 6:
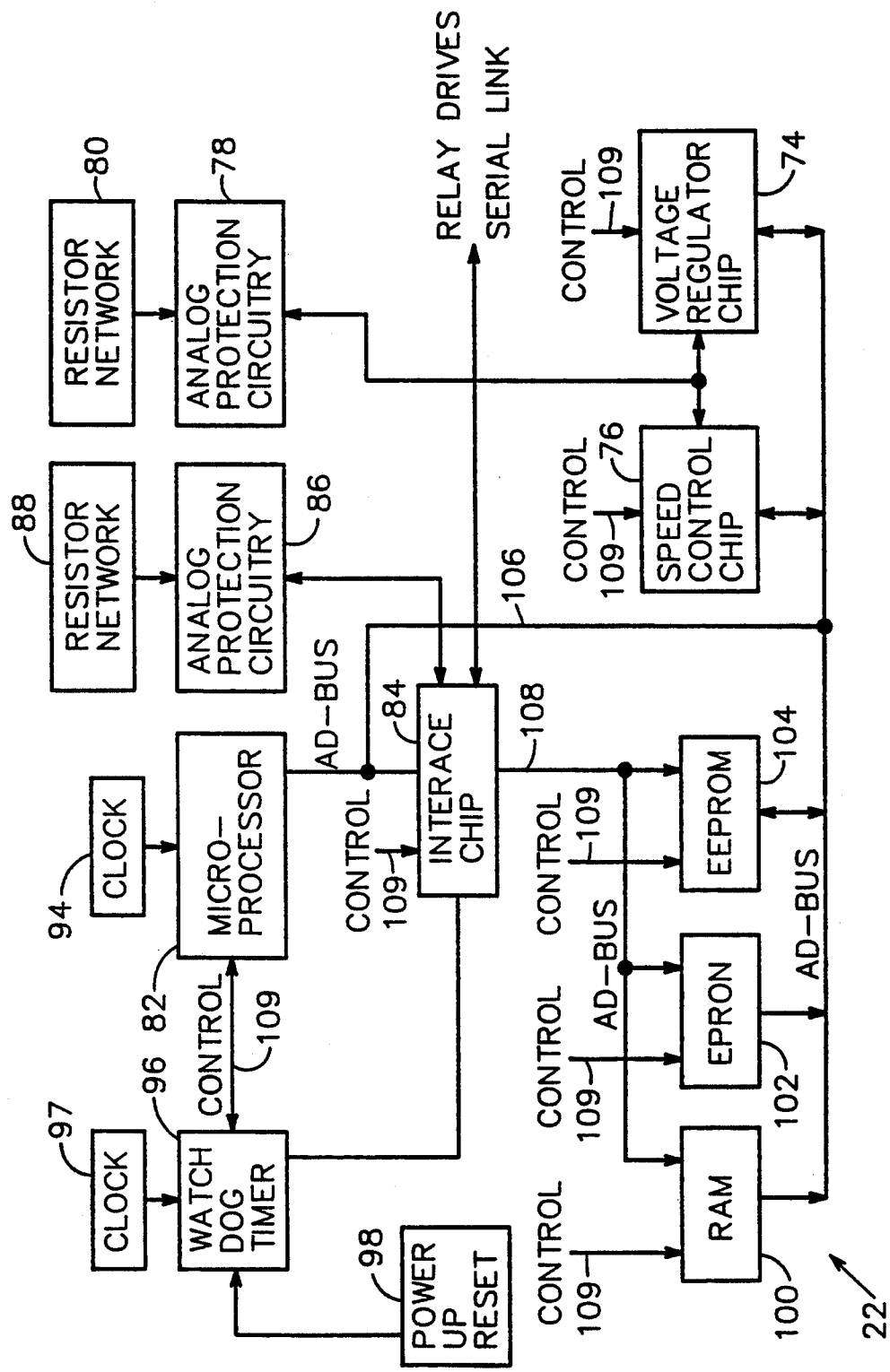
FIG. 6 is a hardware block diagram for the GCU of FIG. 5.

With reference to FIG. 6, a hardware block diagram illustrates the hardware used to implement the functionality of the GCU 22 of FIG. 5. For simplicity, hardware elements of FIG. 6 which correspond to functional elements of FIG. 5 use similar reference numerals.

In the illustrated embodiment, the GCU 22 utilizes an 80186 microprocessor 82 operating at 9.95 MHz. The microprocessor 82 is connected to a clock circuit 94 and to a watchdog timer circuit 96. The watchdog timer circuit has its own clock circuit 97 and is connected to a powerup reset circuit 98. A random access memory,. or RAM, 100, an electrically programmable read only memory, or EPROM, 102, and an electrical erasable programmable read only memory, or EEPROM, 104 are connected to the microprocessor 82 through a combined address and data bus, or AD-bus, 106. The RAM 100, EPROM 102, and EEPROM 104 are used for stack/scratchpad, program storage, and fault codes and BIT messages, respectively. The stored data includes the speed control algorithm, threshold information and gain and compensation constants.

A digital interface circuit chip 84 is also connected to the microprocessor 82 through the AD-bus 106. The interface chip 84 latches memory addresses issued by the microprocessor 82 and controls an address bus 108 connected to the memory circuits 100, 102 and 104. The interface chip 84 also reads data from an analog protection circuit 86 and stores it so that it can be read by the microprocessor 82. Also, the interface chip 84 drives the fault protection relays under control of the microprocessor 82 and communicates with the serial link with a software programmable baud rate. The serial communication link is intended to be used for GCU to GCU communication, or for GCU to bus control unit or other aircraft communications.

The microprocessor 82 at powerup downloads from the EPROM 102 the algorithm and necessary constants required by a digital speed control circuit chip 76 for implementing its control loops, as discussed below. The speed control chip 76 latches the bus addresses internally and permits the microprocessor 82 to write the constants in the speed control chip's RAM on powerup and whenever the speed control chip 76 interrupts the microprocessor 82, if a software "key" is correct. The speed control chip 76 receives its input data from an analog control circuit 78 and outputs a pulse width modulated signal to the servo valve or trim head 68, see FIG. 4, which controls the constant speed drive output speed.

Similarly, the microprocessor 82 downloads from the EPROM 102 the algorithm and necessary constants required by a digital voltage regulator circuit chip 74 to implement its control loops, as discussed below. The voltage regulator chip 74 latches the addresses internally and permits the microprocessor 82 to write the constants in the voltage regulator chip's memory on powerup and whenever the voltage regulator chip 74 interrupts the microprocessor 82, if a software "key" is correct. The voltage regulator chip 74 also receives its input data from the analog control circuit 78 and outputs a pulse width modulated signal to drive the exciter field winding 52, see FIG. 3, which controls the generator output voltage.

Resistor network circuits 80 and 88 divide down high voltage input signals to signal levels that are acceptable for the analog control circuit 78 and the analog protection circuit 86, respectively. The analog control circuit 78 is controlled by the voltage regulator chip 74 and contains the input conditioning circuits for voltage regulation and speed control. There is no connection between the analog control circuit 78 and the microprocessor 82. The analog protection circuit 86 is controlled by the interface chip 84. The analog protection circuit 86 contains the input conditioning circuits for protection and breaker control. As above, there is no direct connection between the analog protection circuit 86 and the microprocessor 82.

The microprocessor 82 also develops control signals on a control bus 109 for connecting to various devices in the GCU 22, as illustrated.

In the illustrated embodiment, the GCU 22 uses custom very large scale integration (VLSI) technology to reduce, size, weight, life cycle costs and improve reliability. Specifically, owing to the use of VLSI technology, the GCU 22 can be built utilizing approximately 300 parts and weighing 5 pounds and having signal level circuits that are general purpose so that they can be employed in all GCU applications without hardware redesign.

The analog control circuit 78 and analog protection circuit 86 employ semi-custom analog arrays and custom resistor networks. The voltage regulator chip 74, speed control chip 76 and interface chip 84 comprise custom digital chips. The interface chip 84 comprises a 42k transistor chip designed and fabricated in two micron CMOS technology. The voltage regulator chip 74 and speed control chip 76 comprise 1.25 micron technology utilizing 74K and 93K transistors, respectively. All three digital clips are designed to function using a ten MHz. clock signal.

Figure 7:
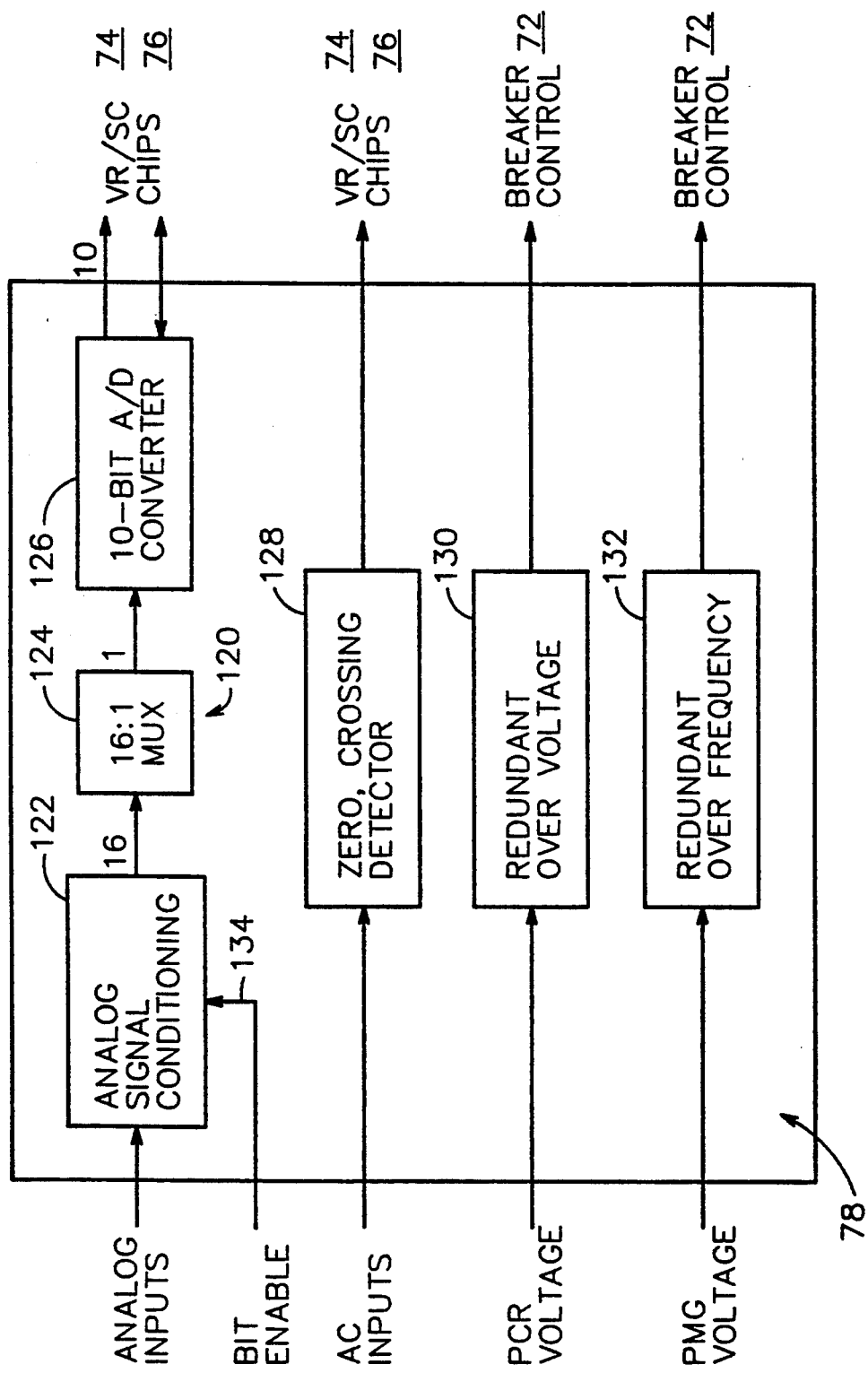
FIG. 7 is a functional block diagram for an analog control circuit of FIG. 6.

With reference to FIG. 7, a block diagram represents the functions performed by the analog control circuit 78. The analog control circuit 78 conditions and digitizes the system condition input signals used by the digital voltage regulator chip 74 and the digital speed control chip 76. The analog control circuit 78 includes three distinct circuits. Amplitude measurements are made by an analog to digital, or A/D, converter section 120 which comprises analog signal conditioning circuits 122, a multiplexer circuit 124 and a ten-bit A/D converter 126. A group of zero crossing detector circuits 128 condition AC waveforms for digital phase and frequency measurements. Finally, redundant hardware protection overvoltage and overfrequency circuits 130 and 132, respectively, are included.

The A/D converter section 120 receives eleven analog inputs to be used by the digital control chips. Specifically, these signals include the point of regulation, or POR, voltage amplitude for each of the three phases; the generator current amplitude for each of the three phases; average POR amplitude, exciter field current, difference from average current, servo current, and POR offset adjust. A twelfth channel is used for an A/D test voltage. The analog signal conditioning circuit 122 conditions each of the analog inputs to a DC voltage. The multiplexer circuit 124 then selects one of up to sixteen channels for A/D conversion which is performed by the ten-bit A/D converter 126 in accordance with an address given by the voltage regulator chip 74.

The A/D section 120 also includes a simple built-in-test (BIT) feature. When a BIT select input on a line 134 to the conditioning circuit 122 is held at logic low, then a fixed test voltage is Switched to each of the analog conditioning channels in place of the normal input signal. Since such signal should produce known values at the output of the converter circuit 126, the DC operation of each analog conditioning block can be tested. In addition, the twelfth multiplexer channel is a fixed A/D test voltage, which is constantly monitored to check the accuracy of the A/D converter circuit 126.

The zero crossing detector circuits 128 are used for AC signals where phase and frequency measurements are required. The zero crossing detector circuits 128 comprise comparators having hysteresis. The hysteresis is designed so that the rising edge of the comparator output appears at the true zero crossing of the input signal, while the falling edge occurs at a non-zero input voltage. This allows phase and frequency measurements to be insensitive to the input signal amplitude so long as the comparator rising edge is used for measurement.

The redundant overvoltage and overfrequency circuits 130 and 132 latch at logic low upon detecting a failure condition. A logic low can only be reset by recycling internal power or reaching a logic high to a protection reset input. The output of each circuit 130 and 132 is passed to a conventional breaker control circuit on the protection side 72.

Figure 8:
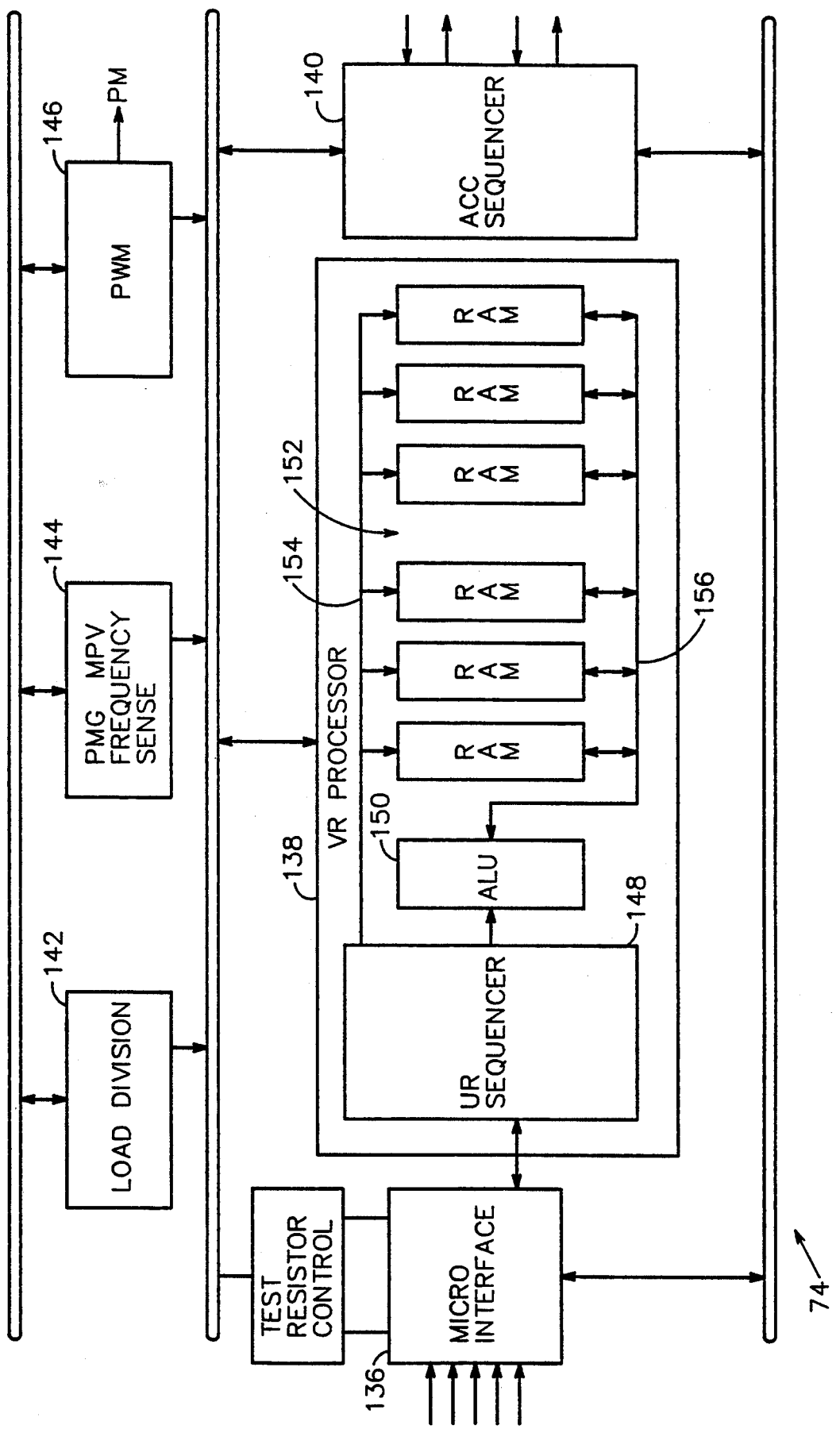
FIG. 8 is an architectural block diagram for a digital voltage regulator circuit of FIG. 6.

With reference to FIG. 8, a generalized block diagram illustrates the architecture of the circuit implementation for the voltage regulator chip 74. The principal circuit function elements comprise a processor interface circuit 136, a processor 138, an ACC sequencer circuit 140, a load division circuit 142, a permanent magnet generator and magnetic pickup unit sense circuit 144, and a pulse width modulation drive circuit 146.

The processor interface circuit 136 is an interface module that controls the data transfer between the system microprocessor 82, see FIG. 5, and the voltage regulator. Programmable and readable registers and RAM memory within the voltage regulator chip 74 are mapped to the memory address interface of the microprocessor 82 for chip initialization, built-in test function, debug and test operations. Microprocessor interface operations to the voltage regulator chip 74 are primarily performed during chip initialization which takes place immediately after system reset, as discussed above.

The voltage regulator processor 138 interfaces with all of the other circuits on the voltage regulator chip 74 and performs all calculations and temporary storage of internal variables. The components of the processor 138 are a sequencer 148, an arithmetic logic unit 150, and a plurality of memory circuits 152. The sequencer 148 controls the loop functions. Any of the loop functions, namely, load division, current limit, high phase takeover, POR average, and the main loop including an exciter field feedback current, can be accessed by the sequencer 148. The sequencer 148 sends out a request, the loop function then performs its task, and returns an acknowledge flag for completion. The sequencer's steps through the downloaded algorithm which is centered around the POR average voltage loop, as discussed below.

The arithmetic logic unit 150 is used to perform fixed point multiplication, addition, subtraction, etc. The sequencer 148 and arithmetic logic unit 150 communicate with the voltage regulator memory 152 via an internal address bus 154 and an internal data bus 156. The memory 152 is divided into a first section containing constants and a second section containing variables generated by the voltage regulator processor 138.

The ACC sequencer circuit 140 is used to provide an interface to the analog control circuit 78, see FIG. 6. This circuit 140 is a ten-bit interface which communicates with the ten-bit A/D converter 126 and the multiplexer 124 of the analog control circuit 78. The sequencer circuit 140 receives end of conversion and ten-bit data lines and provides multiplexer address and strobe control signals to control the A/D converter 126.

The load division circuit 142, the PMG and MPU sense circuit 144, and the PWM circuit 146 are free running peripheral circuits which generate a completion flag to update information. The load division circuit 142 is used in multi-channel operation and operates to divide the load equally between multiple generators. The PMG and MPU frequency sense circuit 144 is used to enable or disable the output driver of the PWM circuit 146 to the exciter field via magnetic pickup ready speed or PMG underfrequency.

The PWM circuit 146 provides a controlling output to the exciter field and to a current driver circuit for regulation of the system voltage. It accepts the calculated input from the voltage regulator control loops which determine the characteristics of the square wave output.

Figure 9:
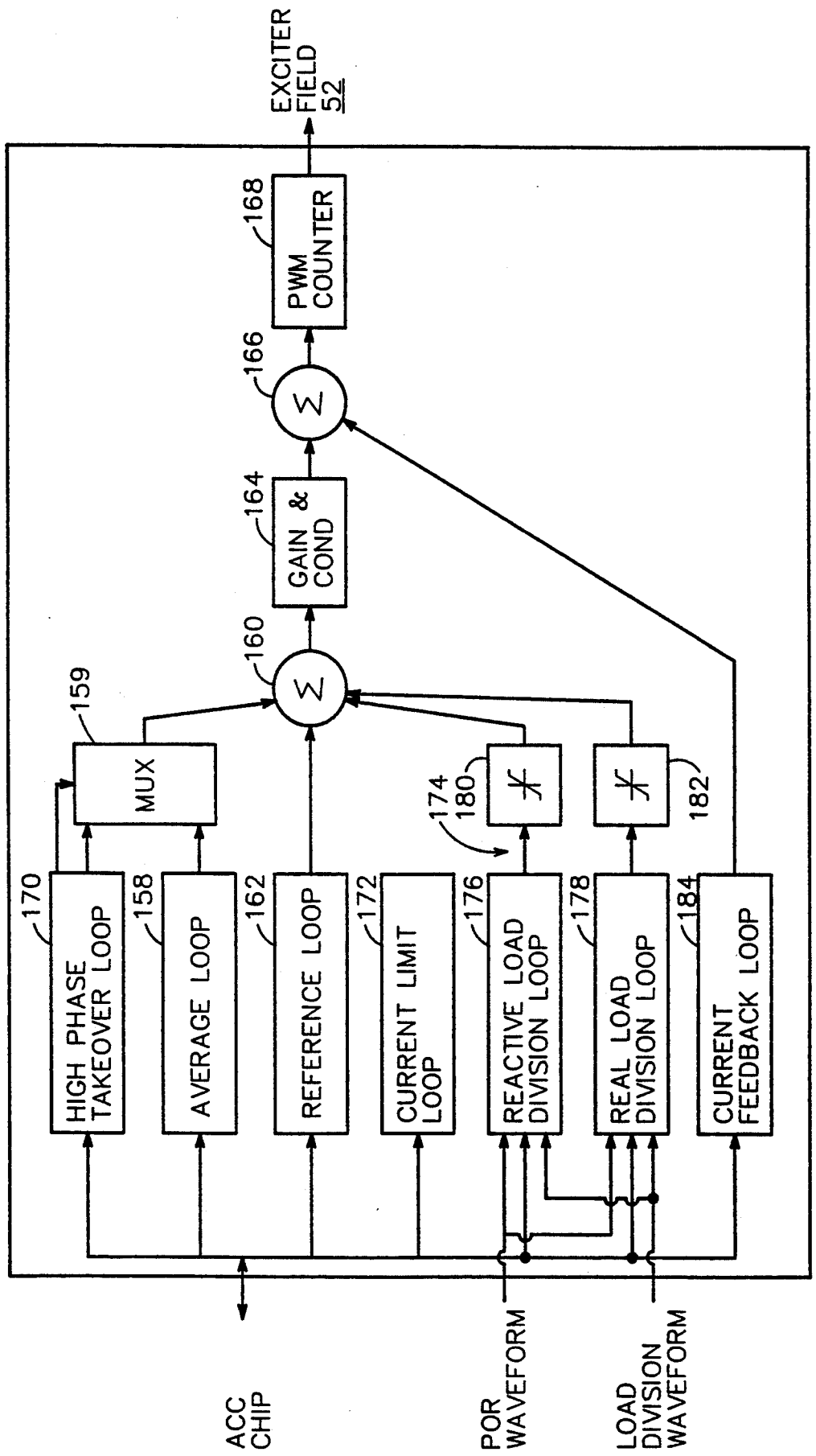
FIG. 9 is a detailed functional block diagram of the control loops implemented in the voltage regulator circuit of FIG. 8.

With reference to FIG. 9, a block diagram illustrates the control loops implemented by the voltage regulator chip 74. The generator's three phase current and voltage signals are sensed at the point of regulation, conditioned by the analog control circuit 78 then sampled by the voltage regulator chip 74. This information is processed by an average loop 158 and applied through a multiplexer 159 to a first summer 160 which also receives a reference value from a reference loop 162. The summer calculates an error representing the difference between the POR input and the POR reference. The error is filtered by a gain and compensation function 164 in such a way as to allow for stable operation, yet have suitably fast transient response over all operating conditions. The filtered error is applied via a second summer 166 to a PWM counter 168 to alter the PWM duty cycle which in turn varies the exciter field current to vary generator output power.

If one or more of the three phases goes above a threshold of, for example, 122 volts RMS, then a high phase takeover loop 170 also connected to the multiplexer 159 takes over control from the average loop 158 to prevent any phases from going higher. During a short circuit in the EPGS 20 a current limit loop 172 connected to the reference loop 162 decreases the POR voltage reference in order to allow a controlled amount of current to flow through the fault. A load division module 174, comprising a reactive load division loop 176 and a real load division loop 178, is operative for multi-channel parallel systems. Its function is to share the load equally among all the generators such that none of the generators support excessive load during steady state operation, which would reduce the life of the generator. The outputs of the loops 176 and 178 are passed through limit functions 180 and 182, respectively, to the first summer 160. A current feedback loop 184 is input to the second summer 168 and is used for compensating the change in exciter field resistance over temperature and life.

Figure 10:
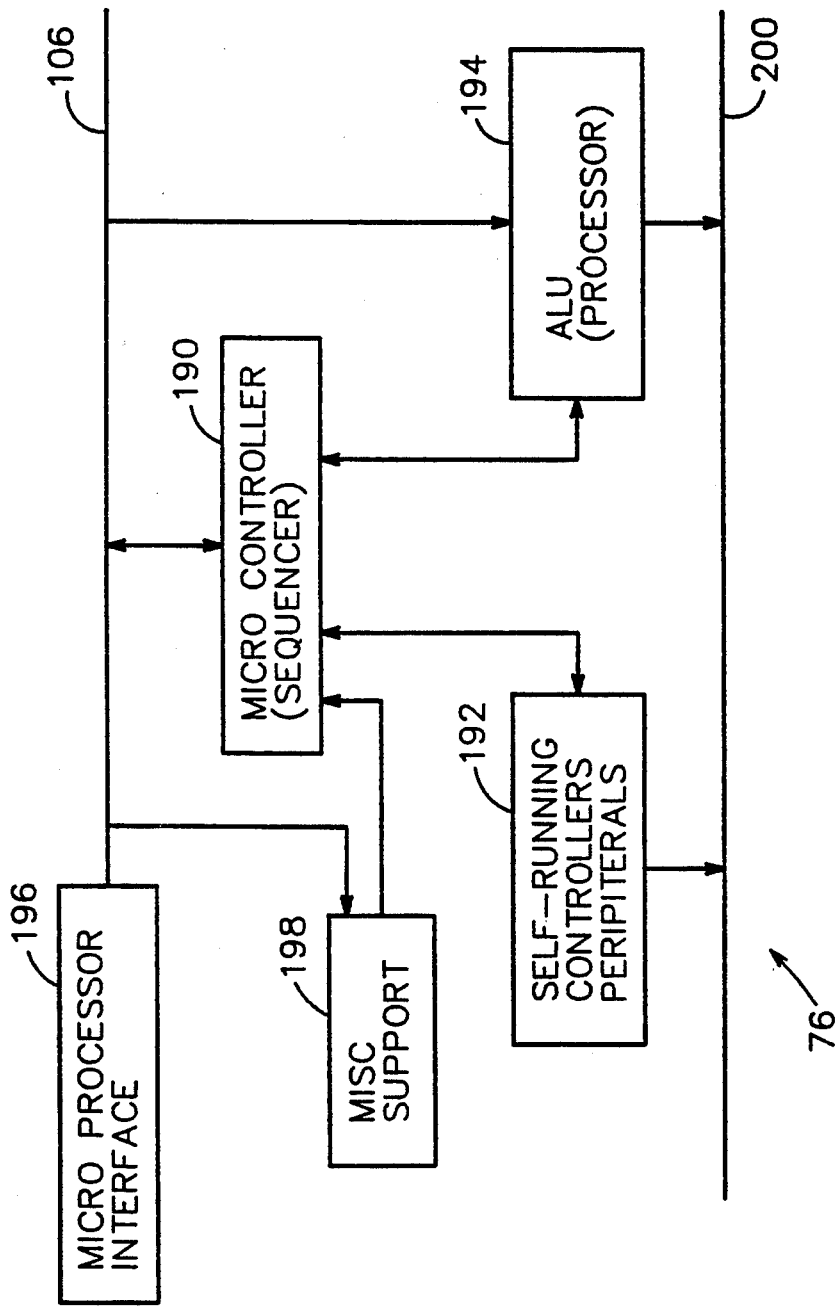
FIG. 10 is an architectural block diagram for a digital speed control circuit of FIG. 6.

With reference to FIG. 10, a block diagram illustrates an architectural implementation for the circuits in the speed control chip 76, see FIG. 6. The speed control chip 76 includes a microcontroller or sequencer 190, self-running or peripheral controllers 192, an arithmetic logic unit, or processor, 194, a microprocessor interface 196, and miscellaneous support devices 198. The sequencer 190 controls data flow, communication, and the execution of processor subroutines. The sequencer utilizes a programmable structure that allows the speed controller chip 76 to respond to each of the sensed parameters as required by the specific application. The self-running controllers 192 include a phase discriminator measuring phase error, frequency discriminators measuring frequency, a real load division cosine calculator calculating the cosine of the angle between the difference from average current and the POR voltage, the pulse width modulator, a programmable internal reference generator, and an A/D interface. The processor 194 contains all the necessary primitives and support hardware needed to fulfill the speed control chip's primary functions of phase control, frequency control, and real load division. The sequence of the primitives and the data the primitives utilize is controlled by the sequencer 190. Some of these primitives include addition, subtraction, multiplication, and compensation.

The microprocessor interface 196 provides the ability to communicate with the system microprocessor 82, see FIG. 5. This channel of communication is used to program the chip's algorithm and application specific constants, monitor chip performance, and for limited control of chip operation.

The support devices 198 consist of the required hardware utilized in the operation of the speed control chip 78. Examples are zero cross filters, a reference selector and a phase conditioner.

Communications to the system microprocessor 82 are provided on the bus 106, while communications between the speed control processor 194 and the peripherals 192 is done on an internal communications bus 200.

Figure 11:
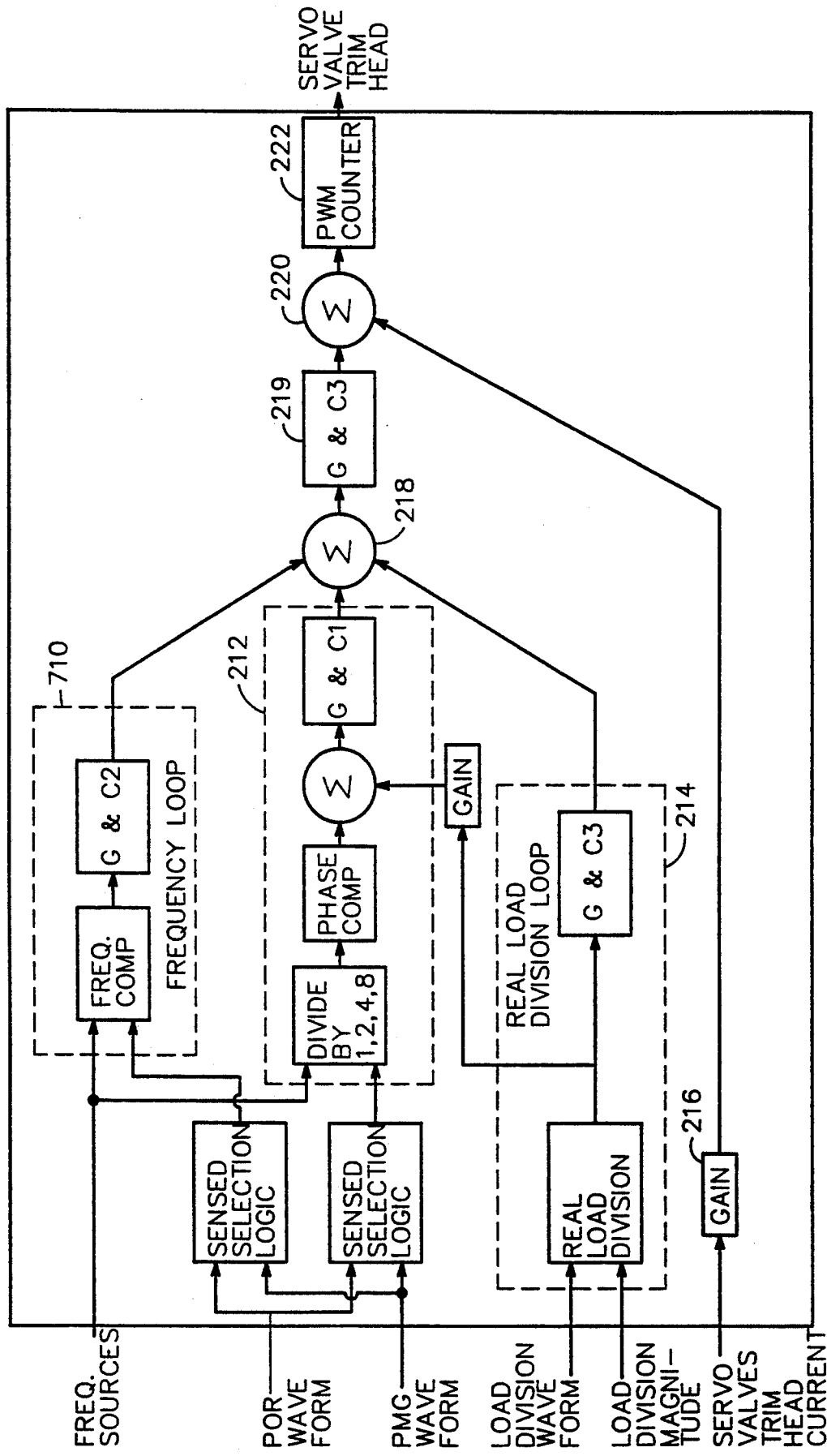
FIG. 11 is a detailed functional block diagram of the control loops implemented in the speed control circuit of FIG. 10.

With reference to FIG. 11, a block diagram illustrates the control loops implemented by the speed control chip 76 for maintaining the output of the constant speed drive 32 at the required constant speed. The required speed control output is derived from three sensed parameters, namely, frequency error between the PMG 46 or POR and a reference signal, phase error between the POR and the reference signal, and the magnitude of the unbalanced real load among generators in parallel. Each of the sensed parameters has its own processing path within the speed control, namely a frequency loop 210 for controlling frequency errors, a phase loop 212 for controlling phase errors, and a real load division loop 214 for real load division errors. A current feedback path through a gain function 216 provides compensation for changes in the servo valve or trim head resistance as it varies over temperature and life. Each of the three loops 210, 212 and 214 has its own gain and compensation function which utilize programmable parameters, as above, and the outputs of the three loops are applied to a summer 218. The output of the summer 218 is filtered at a gain and compensation block 219 and applied to another summer 220 which receives the feedback value from the gain circuit 216. The output of the summer 220 is applied to a PWM counter 222 the output of which alters the PWM duty cycle which in turn varies servo valve or trim head position to control speed.

Figure 12:
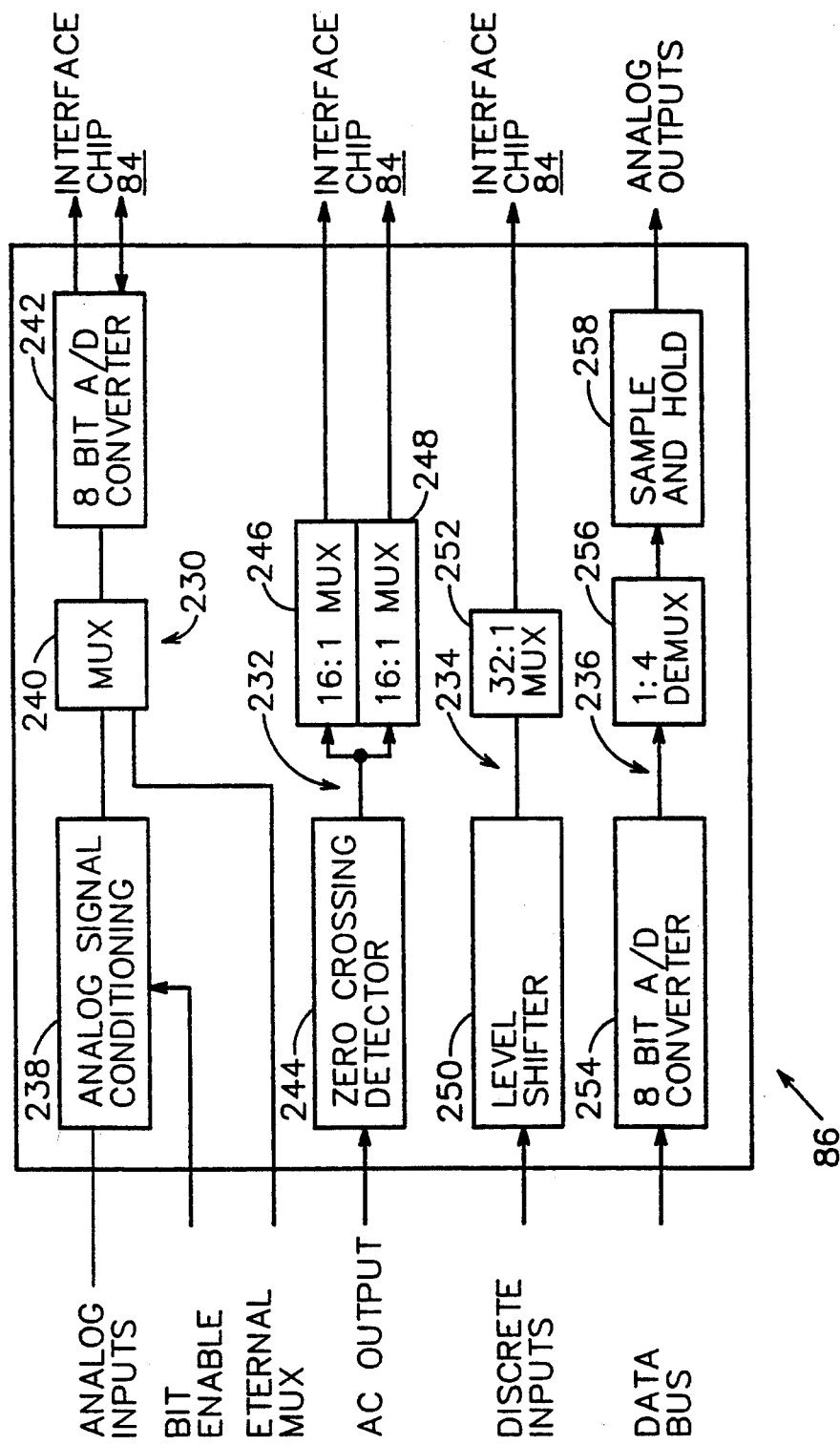
FIG. 12 is a functional block diagram of an analog protection circuit of FIG. 6.

With reference to FIG. 12, a block diagram illustration represents functions performed by the analog protection circuit 86, see FIG. 6. The analog protection circuit 86 conditions and digitizes the input signals used for breaker control and protection functions. Also, it may include a D/A converter used for driving analog meters.

The analog protection circuit 86 is generally similar to the analog control circuit 78, see FIG. 7. It includes an A/D converter section 230 which provides amplitude measurement, a zero crossing section 232 which conditions AC wave forms for phase and frequency measurements, a discrete section 234 used for level shifting and multiplexing of discrete inputs, and a D/A section 236 which provides analog outputs used to drive cockpit mounted meters.

The A/D converter section 230 includes forty-eight input channels to an analog signal conditioning circuit 238. A forty-nine to one channel multiplexer circuit 240 receives the forty-eight condition signals along with an additional signal which permits an external sixteen to one multiplexer to be connected to the forty-ninth channel. Therefore, a total of sixty-four analog inputs can be converted by an eight-bit A/D converter 242 which are then transmitted to the interface chip 84. A BIT enable function to the analog signal conditioning circuit 238 is provided, similar to that discussed above relative to the analog control circuit 78, see FIG. 7.

The zero crossing section 232 includes zero crossing detectors 244, similar to the detectors 128, see FIG. 7, discussed above. However, to minimize chip pin count, two sixteen to one multiplexers 246 and 248 are used so that only two of the multiplexers zero crossing detectors are observed at any time by the interface chip 84.

The system microprocessor 82 uses several discrete signals for breaker control and protection. However, since these signals are either switches connected to ground or switches connected to plus 28 volt DC, they must be conditioned to five volt logic level signals using level shifter circuits 250. In addition, a thirty-two channel to one multiplexer circuit 252 is used to decrease the number of external pins to the interface chip 84.

The D/A section 236 contains an eight-bit D/A converter and a one channel to four channel demultiplexer circuit 256. A sample and hold circuit 258 is provided on each channel for maintaining the signal level to the remote meters.

Although not specifically illustrated herein, the voltage divider or resistor network circuits 80 and 88, see FIGS. 5 and 6, comprise thin film resistor networks which decrease 115 volt AC signals to five volt DC peak signals.

Figure 13:
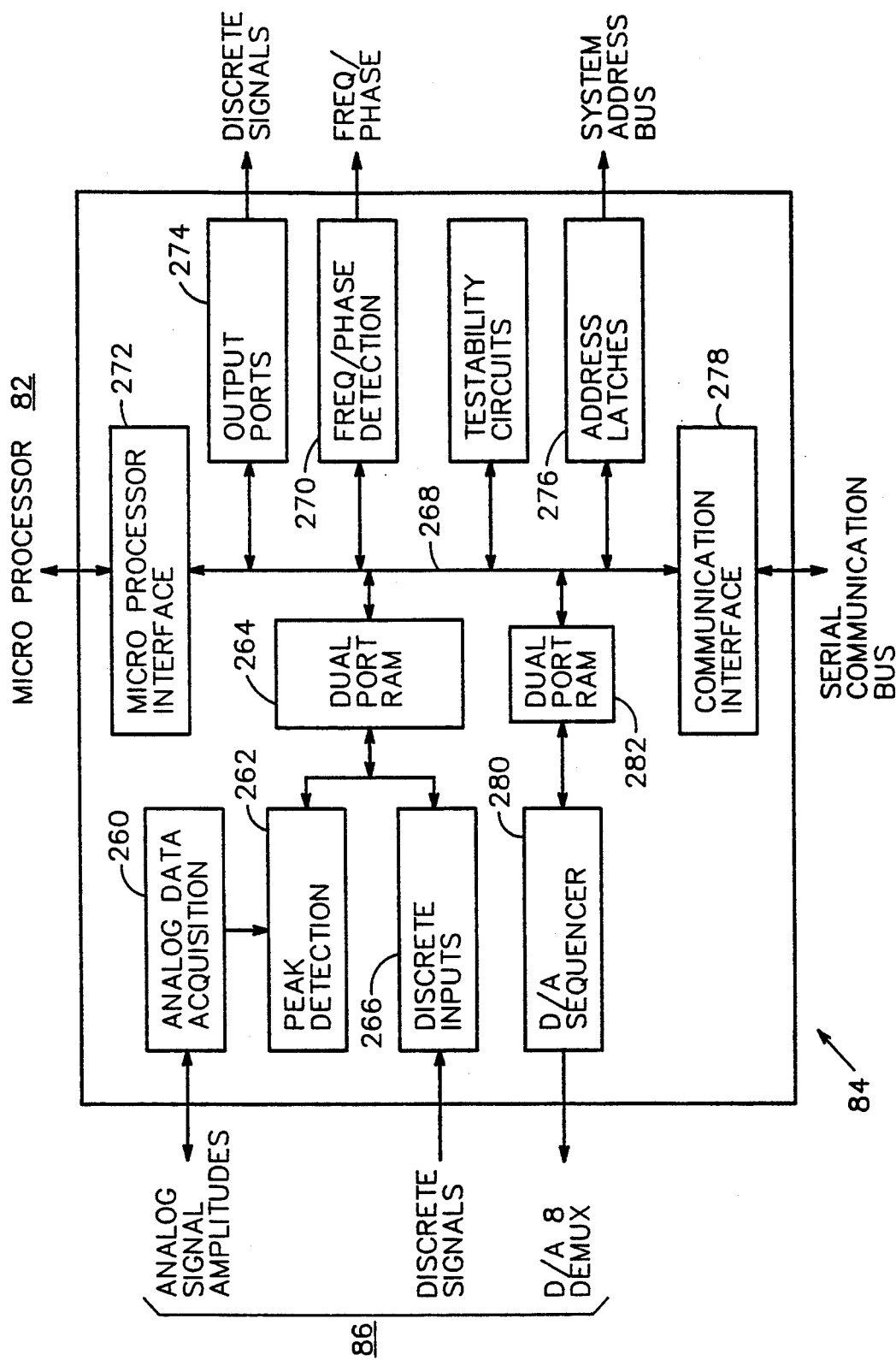
FIG. 13 is a block diagram of a digital interface circuit of FIG. 6.

With reference to FIG. 13, a block diagram illustrates a circuit implementation for the interface chip 84, see FIG. 6. A principal function of the interface chip 84 is to provide communication between the microprocessor 82 and miscellaneous input and output devices.

An analog data acquisition circuit 260 receives analog signal amplitudes from the analog protection circuit 86 and is coupled through a peak detection circuit 262 to a dual port RAM memory 264. Discrete signals from the analog protection circuit 86 are coupled through a discrete input circuit 266 to the dual port RAM. The dual port RAM is in turn connected to an internal communication bus 268 which also receives signal frequency and phase information from a frequency/phase detection circuit 270, also connected to the analog protection circuit 86. The data collected in the dual port RAM 264 and frequency/phase detection circuit 270 is provided on the communication bus 268 and through a microprocessor interface circuit 272 to the microprocessor 82 so that it can carry out protection functions, breaker control functions, communication functions, and BIT functions.

Output control elements within the interface chip 84 consist of output ports 274 to command breaker/contactor open and closed position and to provide discrete interface to the aircraft and to command signals for the BIT function. Address latch circuits 276 provide system memory addressing. A communication interface circuit 278 comprising a universal asynchronous receiver transmitter, or UART, transmits and receives serial data to and from other generator control units or aircraft devices.

A D/A sequencer 280 is connected to the communication bus 268 through a second dual port RAM 282 for coordinating analog data output from the analog protection circuit 86.

Thus, in accordance with the above, a generator control unit is provided with separate digital control circuits for implementing voltage regulation and speed control. These circuits are manufactured using custom very large scale integration (VLSI) technology to reduce size, weight, life cycle costs and improve reliability. Specifically, owing to the use of VLSI technology, the GCU 22 can be built utilizing approximately 300 parts and weighing 5 pounds and having signal level circuits that are general purpose so that they can be employed in all GCU applications without hardware redesign. Further, the GCU provides isolation between protection circuits and control circuits.

I claim:

1. A generator control unit for an electrical power generating system (EPGS) having a generator, a drive for the generator, and fault control means connecting said generator in the EPGS for protecting the EPGS under fault conditions, the generator control unit comprising:

a control circuit including means responsive to system condition inputs for controlling generator operation to maintain generator output power at a desired voltage level and frequency, wherein said control circuit includes first and second digital control circuits for developing respective first and second control signals for controlling generator output voltage and generator speed, each digital control circuit comprising a processor which develops the respective control signal in accordance with an algorithm including at least one gain and compensation function and a memory associated with the processor and storing algorithm and gain and compensation variables for retrieval by the processor in performing the algorithm; and a protection circuit including a processor responsive to system condition inputs for controlling operation of said fault control means, and a digital interface circuit providing a communication interface between said processor and the system condition inputs and between said processor and said fault control means, wherein said protection circuit processor is connected with said first and second digital control circuits for loading said variables into said memories.

2. The generator control unit of claim 1 wherein said protection circuit processor loads the one algorithm into said memories.

3. A generator control unit for an electrical power generating system (EPGS) having a generator, with means responsive to a first control signal for varying generator output power, a drive for the generator, with means responsive to a second control signal for varying the generator speed, and fault control means connecting said generator in the EPGS for protecting the EPGS under fault conditions, the generator control unit comprising:

a control circuit including means responsive to system condition inputs for developing said first and second control signals to maintain generator output power at a desired voltage level and frequency, said control circuit including first and second digital control circuits for developing said first and second control signals, respectively, wherein said first and second digital control circuits each comprise a processor which develops the respective control signal in accordance with an algorithm including at least one gain and compensation function and a memory connected with the processor and storing said algorithm and gain and compensation function variables for retrieval by the processor in performing the algorithm;

a protection circuit including a processor responsive to system condition inputs for controlling operation of said fault control means, wherein said protection circuit processor is connected with said first and second digital control circuits for loading said variables into said memories;

a first analog circuit operatively associated with said control circuit providing a signal conditioning interface between said developing means and the system condition inputs; and a second analog circuit operatively associated with said protection circuit providing a signal conditioning interface between said processor and the system condition inputs.

4. The generator control unit of claim 3 wherein said protection circuit processor loads the one algorithm into said second digital control circuit's memory.

* * * * *